(12) United States Patent
Li

(10) Patent No.: US 10,931,211 B2
(45) Date of Patent: Feb. 23, 2021

(54) LEVITATION MECHANISM FOR IMITATION CANDLE DEVICES

(71) Applicant: Xiaofeng Li, Shenzhen (CN)

(72) Inventor: Xiaofeng Li, Shenzhen (CN)

(73) Assignee: L&L Candle Company, LLC, Brea, CA (US)

( * ) Notice: Subject to any disclaimer, the term of this patent is extended or adjusted under 35 U.S.C. 154(b) by 0 days.

(21) Appl. No.: 16/604,775

(22) PCT Filed: Apr. 12, 2017

(86) PCT No.: PCT/CN2017/080297
§ 371 (c)(1),
(2) Date: Oct. 11, 2019

(87) PCT Pub. No.: WO2018/187994
PCT Pub. Date: Oct. 18, 2018

(65) Prior Publication Data
US 2020/0412281 A1 Dec. 31, 2020

(51) Int. Cl.
*H02N 15/00* (2006.01)
*F21V 1/00* (2006.01)
*F21S 10/04* (2006.01)
*F21S 6/00* (2006.01)

(52) U.S. Cl.
CPC .............. *H02N 15/00* (2013.01); *F21S 6/001* (2013.01); *F21S 10/046* (2013.01); *F21V 1/00* (2013.01)

(58) Field of Classification Search
CPC ................................. F21S 6/001; F21S 10/046
See application file for complete search history.

(56) References Cited

U.S. PATENT DOCUMENTS

| | | | | |
|---|---|---|---|---|
| 4,551,794 A * | 11/1985 | Sandell | ................... | F21S 10/04 362/392 |
| 9,133,992 B2 * | 9/2015 | Lee | .......................... | F21L 4/08 |
| 9,388,954 B2 | 7/2016 | Lai | | |
| 9,528,670 B2 * | 12/2016 | Wu | ....................... | F21S 10/046 |
| 9,719,643 B1 * | 8/2017 | Cheng | .................. | F21S 10/046 |
| 9,810,388 B1 * | 11/2017 | Li | ........................... | F21V 23/04 |

(Continued)

FOREIGN PATENT DOCUMENTS

CN 102721002 A 10/2012
CN 203190294 U 9/2013
(Continued)

*Primary Examiner* — Alexander K Garlen
(74) *Attorney, Agent, or Firm* — Perkins Coie LLP

(57) ABSTRACT

The disclosed embodiments relate to devices and methods for facilitating the operations and usage of electronic candle devices. In one exemplary aspect, an imitation candle device is disclosed. The imitation candle device comprises a body including a top surface, the top surface including an opening; a flame element having an upper portion shaped to mimic a flame of a candle and to protrude out of the opening, and a magnetic lower portion; and a magnetic base plate positioned within the body and below the flame element, comprising: a central section operable to repel the magnetic lower portion of the flame element, a peripheral section operable to attract the magnetic lower portion of flame element, and a plurality of light sources to emit light onto the flame element.

12 Claims, 7 Drawing Sheets

(56) References Cited

U.S. PATENT DOCUMENTS

| | | | | |
|---|---|---|---|---|
| 2006/0034100 A1* | 2/2006 | Schnuckle | ............... | B44C 5/06 |
| | | | | 362/161 |
| 2010/0079999 A1 | 4/2010 | Schnuckle | | |
| 2011/0248807 A1* | 10/2011 | Wang | ..................... | A63H 33/26 |
| | | | | 335/296 |
| 2012/0134157 A1* | 5/2012 | Li | ........................... | F21K 9/00 |
| | | | | 362/277 |
| 2013/0050985 A1* | 2/2013 | Kwok | .................. | F21S 10/046 |
| | | | | 362/96 |
| 2014/0218903 A1* | 8/2014 | Sheng | .................. | F21S 10/046 |
| | | | | 362/190 |
| 2015/0124442 A1* | 5/2015 | Ding | ....................... | F21S 6/001 |
| | | | | 362/231 |
| 2015/0362141 A1* | 12/2015 | Chen | ........................ | F21S 9/02 |
| | | | | 362/183 |
| 2016/0053954 A1* | 2/2016 | Lai | .......................... | F21V 23/00 |
| | | | | 362/393 |
| 2016/0109083 A1* | 4/2016 | Li | .......................... | F21S 10/04 |
| | | | | 362/84 |
| 2017/0023196 A1* | 1/2017 | Li | ......................... | F21S 10/046 |
| 2017/0130918 A1* | 5/2017 | Li | ........................... | H01F 7/064 |
| 2017/0159901 A1* | 6/2017 | Li | ........................ | F21S 10/046 |

FOREIGN PATENT DOCUMENTS

| | | |
|---|---|---|
| CN | 103343939 A | 10/2013 |
| CN | 203273669 U | 11/2013 |
| CN | 203771082 U | 8/2014 |
| CN | 106482067 A | 3/2017 |

* cited by examiner

LEVITATION MECHANISM FOR IMITATION CANDLE DEVICES

TECHNICAL FIELD

This patent document relates to flameless candles. Particularly, the present disclosure relates to novel and advantageous flameless candles that use a magnetic levitation mechanism to simulate a realistic flame-like flicker.

BACKGROUND

Traditional candles, when lit, provide a pleasant ambiance in places such as homes, hotels, businesses, etc. The use of traditional candles, however, can be hazardous for several reasons. For example, a traditional candle can lead to risk of fire, damage to surface caused by hot wax, injuries suffered as a result of the hot wax or the flame, and possible emission of soot. Flameless candles have become increasingly popular alternatives to traditional candles. With no open flame or hot melted wax, flameless candles provide a longer-lasting, safe, and clean alternative. There are flameless candles available that use incandescent lamps or light-emitting diodes (LEDs) as a light source. Further, these flameless candles include mechanical components that can enable a flame element to have a natural flame-like flicker of light.

SUMMARY OF PARTICULAR EMBODIMENTS

The disclosed embodiments relate to devices and methods for facilitating the operations and usage of electronic candle devices. The disclosed features enable the flame element of the electronic candle devices to move and appear to be a natural flame-like flicker.

In one exemplary aspect, an imitation candle device is disclosed. The imitation candle device comprises a body including a top surface, the top surface including an opening; a flame element having an upper portion shaped to mimic a flame of a candle and to protrude out of the opening, and a magnetic lower portion; and a magnetic base plate positioned within the body and below the flame element, comprising: a central section operable to repel the magnetic lower portion of the flame element, a peripheral section operable to attract the magnetic lower portion of flame element, and a plurality of light sources to emit light onto the flame element.

The above and other aspects and their implementations are described in greater detail in the drawings, the description and the claims.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Figure 1A:
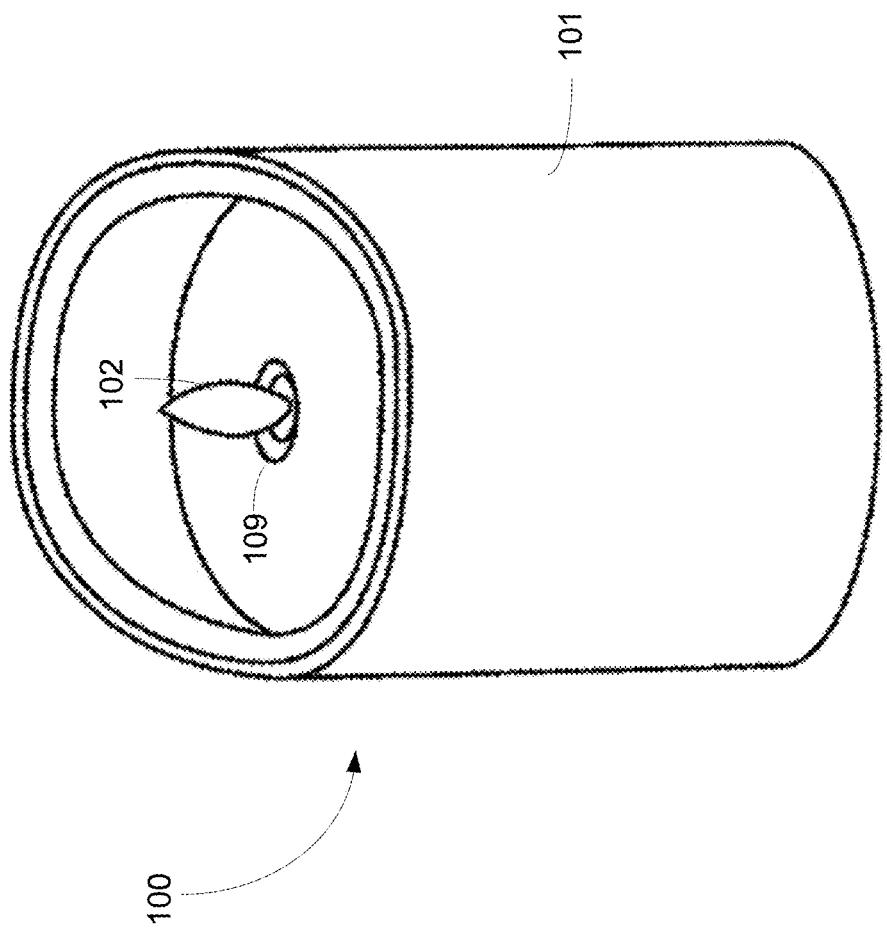
FIG. 1A shows an exemplary imitation candle device.
Figure 1B:
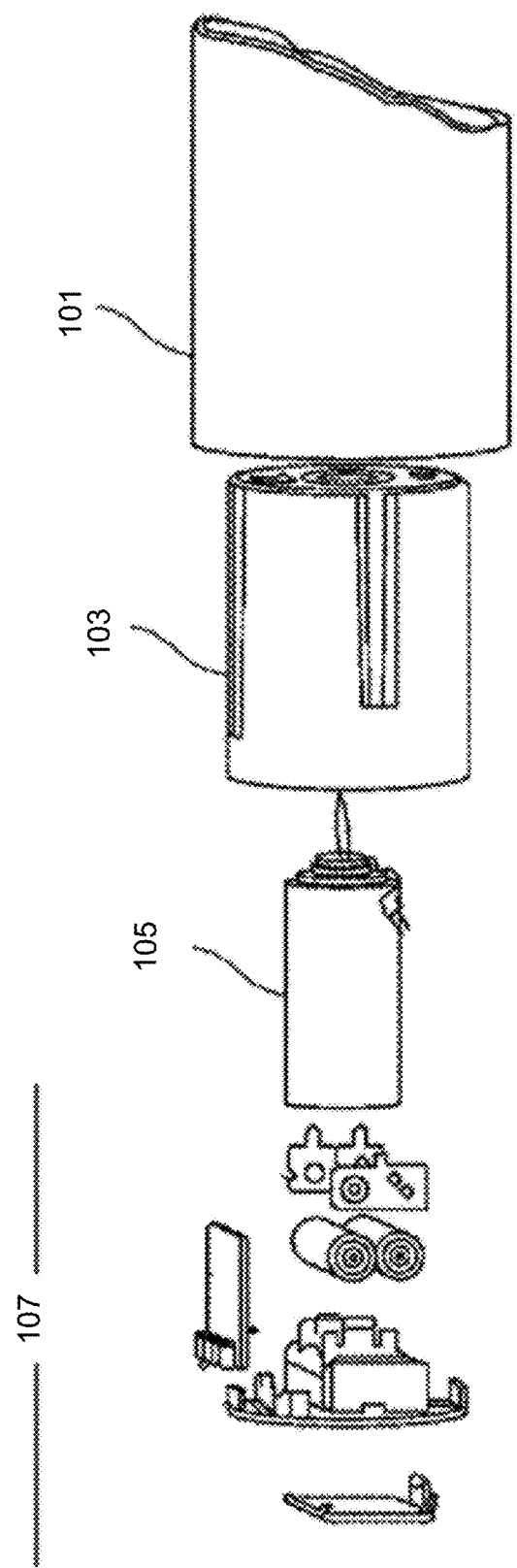
FIG. 1B shows some exemplary components of an imitation candle device.
Figure 2:
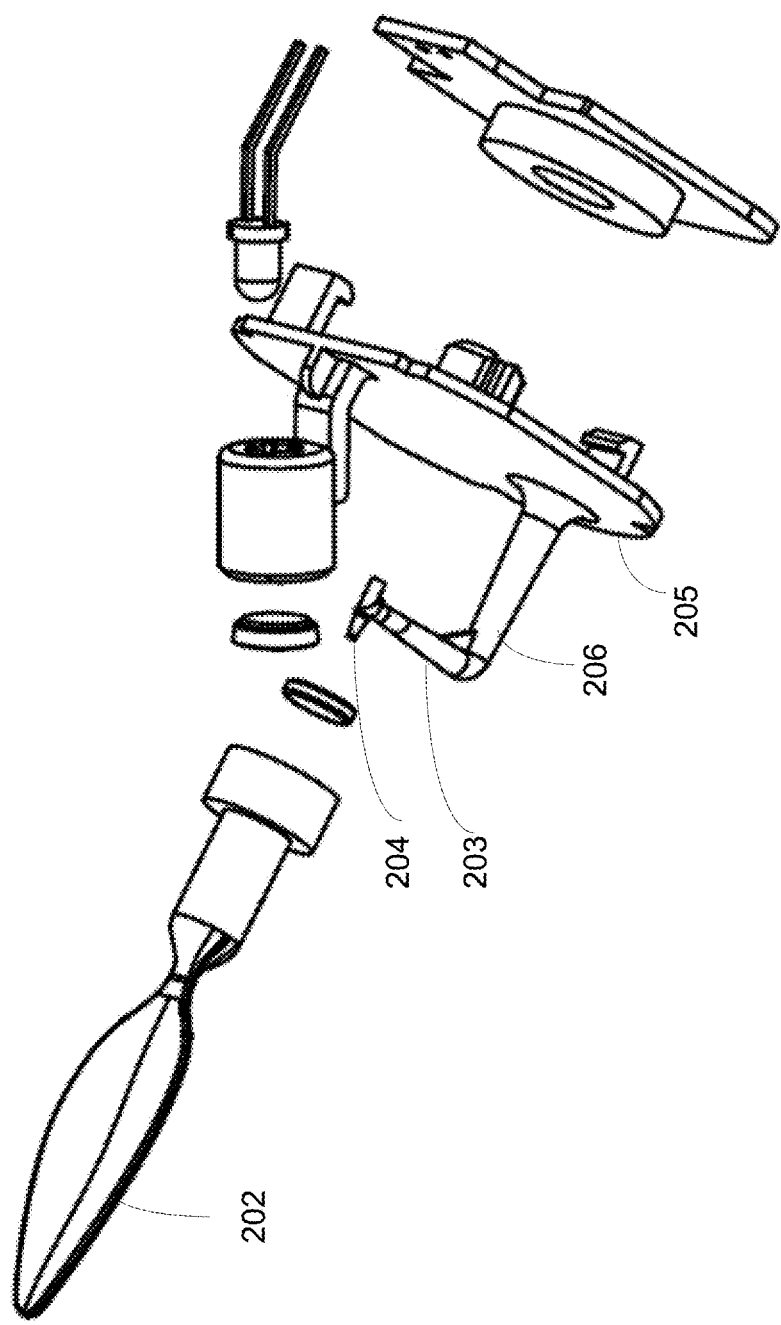
FIG. 2 shows an exemplary swing mechanism for an imitation candle device.

A flameless candle and a corresponding swing mechanism for the moving flame is disclosed in FIGS. 1A to 2 to provide context for the present application and to understand the novel and advantageous aspects of the present application. Additional swing mechanisms for the imitation candle can be found in U.S. patent application Ser. No. 15/212,074, filed on Jul. 15, 2016, the disclosures of which are hereby incorporated by reference in its entirety.

FIGS. 1A-1B illustrate a schematic view showing the appearance of a prior art imitation candle device. The imitation candle device 100, which is shaped as a true candle, comprises: a shell 101, a casing 103 sleeved within the shell 101, a core 105 and a base 107 installed within the casing 103. The casing 103 is provided with an opening on its top section that aligns with opening 109 at the top-center of the shell 101. A flame element 102 is arranged in the opening 109. A portion of the flame element 102 which protrudes outside through the opening 109 is shaped as a flame of a burning candle. The light emitted from a light-emitting element is projected from inside of the candle device, at an angle, onto the portion of the flame element 102 which protrudes outsides through the opening 109. Further, the flame element may swing under the action of natural wind, a fan that blows air onto the flame element or a magnetic field that interacts with a magnetic portion of the flame element that swings on a swing mechanism arranged within the core 105. In this way, the flame simulated by the flameless candle, when viewed from a distance, flickers like that of a true candle, as if it is a perfectly realistic flame.

FIG. 2 shows an exemplary embodiment of a swing mechanism that includes a support mount. The support mount includes a horizontal arm 203 for supporting the flame element 202. One side of the horizontal arm 203 is connected to the top of a vertical post 206 that extends downwards so that the bottom of the vertical post 206 is attached to a base 205 of the support mount. In an example aspect, the horizontal arm 5003 can be orthogonal to a vertical post 206.

Another side of the horizontal arm 203 extends laterally towards the flame element 202 and attaches to a vertical section 204 that provides a top portion that rises above the horizontal arm 203. The top portion of the vertical section 204 is positioned to receive the flame element 202. The vertical section 204 can also provide a bottom portion that extends below the horizontal arm 203. The horizontal arm 203 attached to vertical section 5004 can form a T-shaped structure. In an exemplary embodiment, as shown in FIG. 2, a section of the top portion of the vertical section 204 has a smaller diameter than the bottom portion of the vertical section 5004. The vertical section 204 with a bottom portion can provide additional stability to the flame element 202.

While previous swing mechanisms, such as the one illustrated in FIG. 2, allow the movement of the flame element to achieve a good flickering effect that mimics the real flame, they generally require manufacturing and assembly of various parts. This patent document describes a magnetic levitation mechanism that simplify the manufacturing and assembling process yet still allows the flame element to achieve a visually appealing flickering effect.

Figure 3:
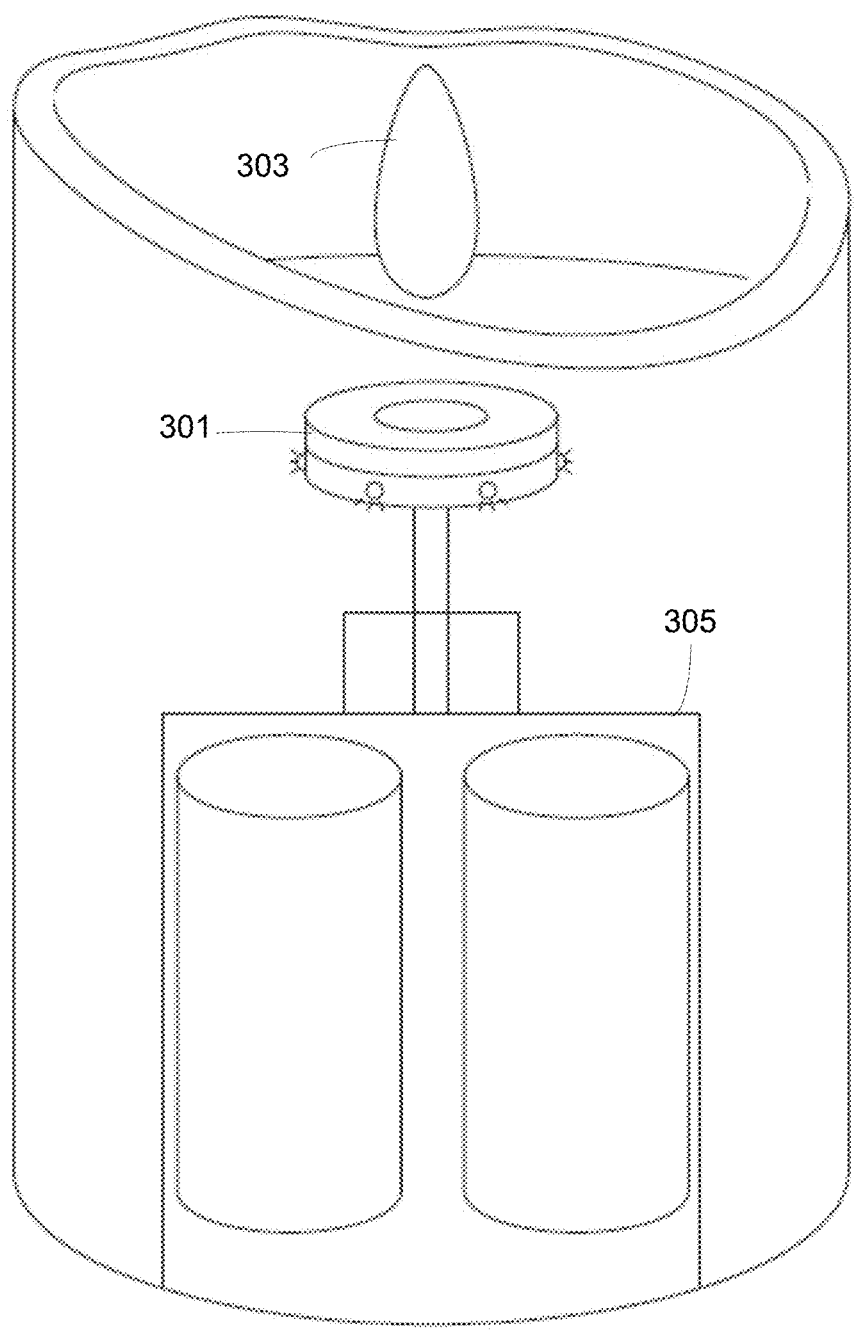
FIG. 3 shows a schematic diagram of an exemplary magnetic levitation mechanism for an imitation candle device.

FIG. 3 illustrates a magnetic levitation mechanism that includes a magnetic base plate 301 and a flame element 303. The magnetic base plate 301 is positioned within the casing 103 of the imitation candle device. In this exemplary embodiment, it is positioned above a core 305. In some implementations, it can also be arranged within the core 305. When the device is turned on, the magnetic base plate 301 exerts magnetic forces on the flame element 303 to enable it to levitate above the base plate 303 and achieve a freeform movement. No additional parts are necessary to couple the flame element 303 with the magnetic base plate 301.

Figure 4:
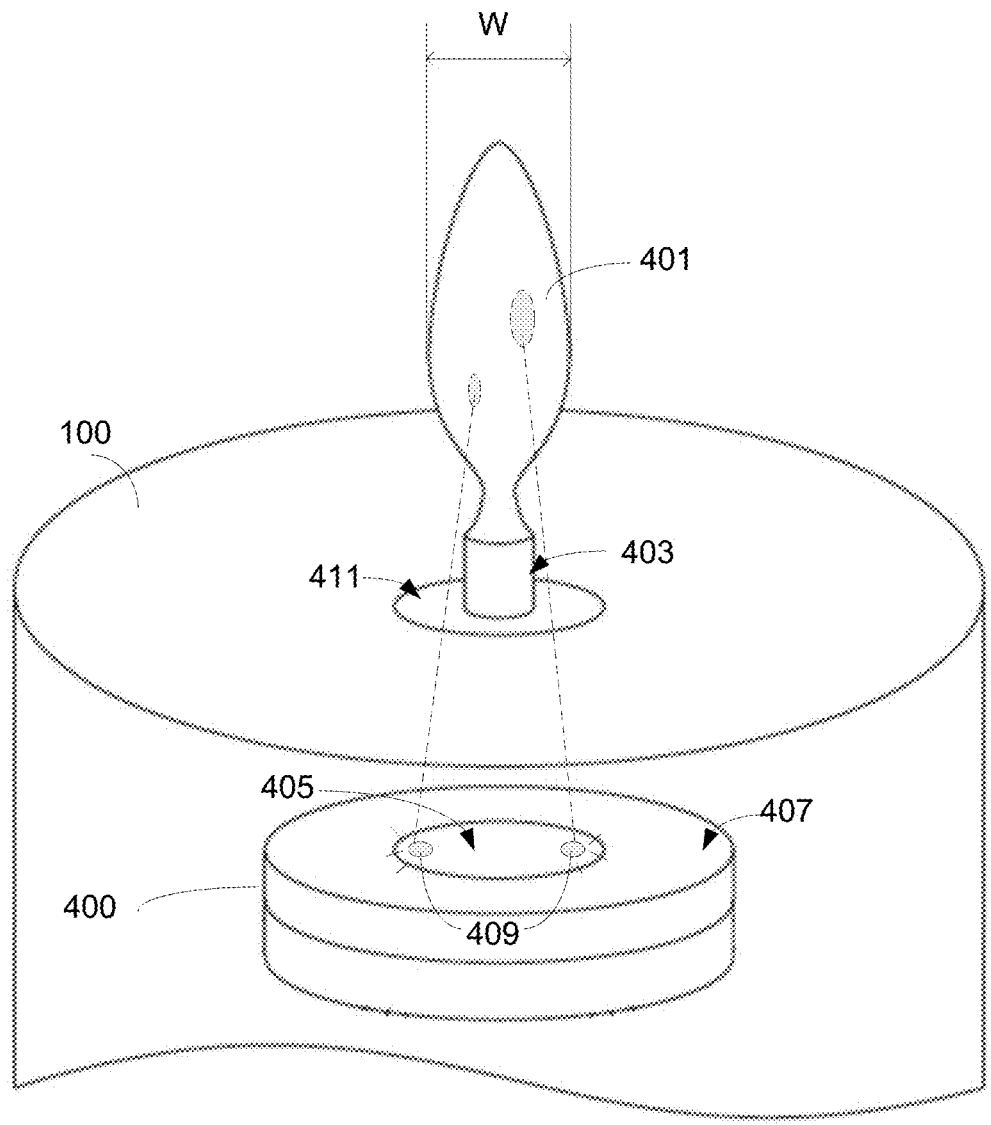
FIG. 4 shows a detailed schematic diagram of an exemplary magnetic levitation mechanism.

FIG. 4 shows a more detailed diagram of an exemplary magnetic levitation mechanism that includes a base plate 400 and a flame element 401. The flame element 401 includes a magnetic lower portion 403. The base plate includes at least two sections: a central section 405 that repels the magnetic lower portion 403 of the flame element 401, and a surrounding section 407 that attracts the magnetic lower portion 403 of the flame element 401. The central section 405 is an electromagnet, while the surrounding section 407 can be either a permanent magnet or an electromagnet. When the flame element 401 is positioned above the central section 405, the magnetic fields produced by the two sections of the base plate 400 exerts opposite magnetic forces on the magnetic lower portion 403 of the flame element 401 and allow the flame element 401 to levitate above the base plate 400. The magnitude of the magnetic fields produced by the base plate 400 fluctuates under control of the central control circuit, introducing variation of the movement of the flame element 401. In some embodiments, the flame element 401 swings back and forth. In some embodiments, the flame element 401 can also rotate gradually around its center line.

In the depicted embodiment of FIG. 4, it is desirable for the flame element 401 to be positioned directly above the central section 405 of the base plate 403, because otherwise the magnetic forces exerted on the magnetic base 403 may not balance and the flame element 401 may tip over and/or not levitate properly over the base plate 400. Therefore, it is important to have a guidance for the user to place the flame element 401 at a proper location. The opening 411 at the top center of the shell of the candle body 100 can facilitate the placement of the flame element 401 by the user. In some embodiments, the opening 411 has a diameter substantially similar to the diameter of section 405. The opening 411 can serve at least two functions. First, the opening 411 provides space for the movement of the flame element 401 to simulate the appearance of a real flame. Second, the opening limits the space for the user to place the flame element 401, thereby preventing the flame element 401 from tipping over due to unbalanced magnetic forces. In some embodiments, the diameter of the opening is smaller than the width W of the top part of the flame element 401 such that, when the imitation candle device 100 is turned off and the base plate 403 no longer provides magnetic forces to the flame element 401, the opening can prevent the flame element 401 from falling into the candle body 100 of the imitation candle device.

In some embodiments, the base plate 400 may further include a plurality of light sources 409, such as LED lights. The light sources 409 can be positioned on the base plate 400 to cast angled light beams onto the flame element 401. In some embodiments, the light sources 409 can be positioned at other locations of the base plate 400 as long as the light beams can be projected or directed onto the flame element 401 successfully. As the flame element 401 levitates above the base plate 400 and swings in freeform movement, the angles of the light beams that illuminate the flame element 401 undergo various changes to further allow the flame element 401 to appear like of real flames.

Figure 5A:
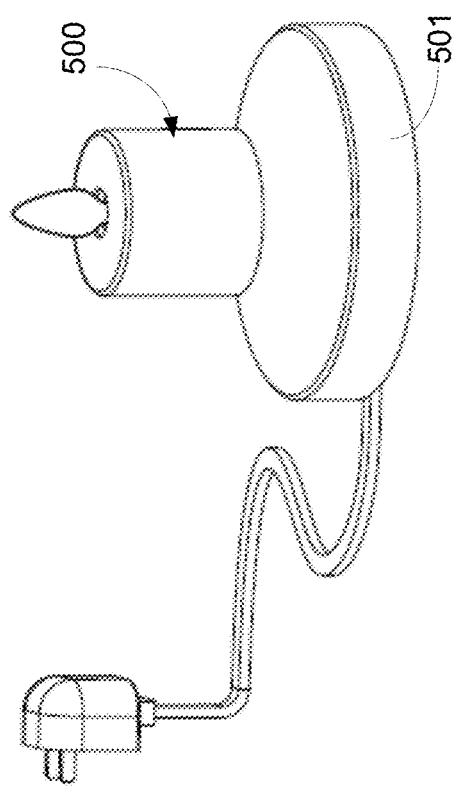
FIG. 5A shows an exemplary magnetic levitation mechanism for an imitation candle system.
Figure 5B:
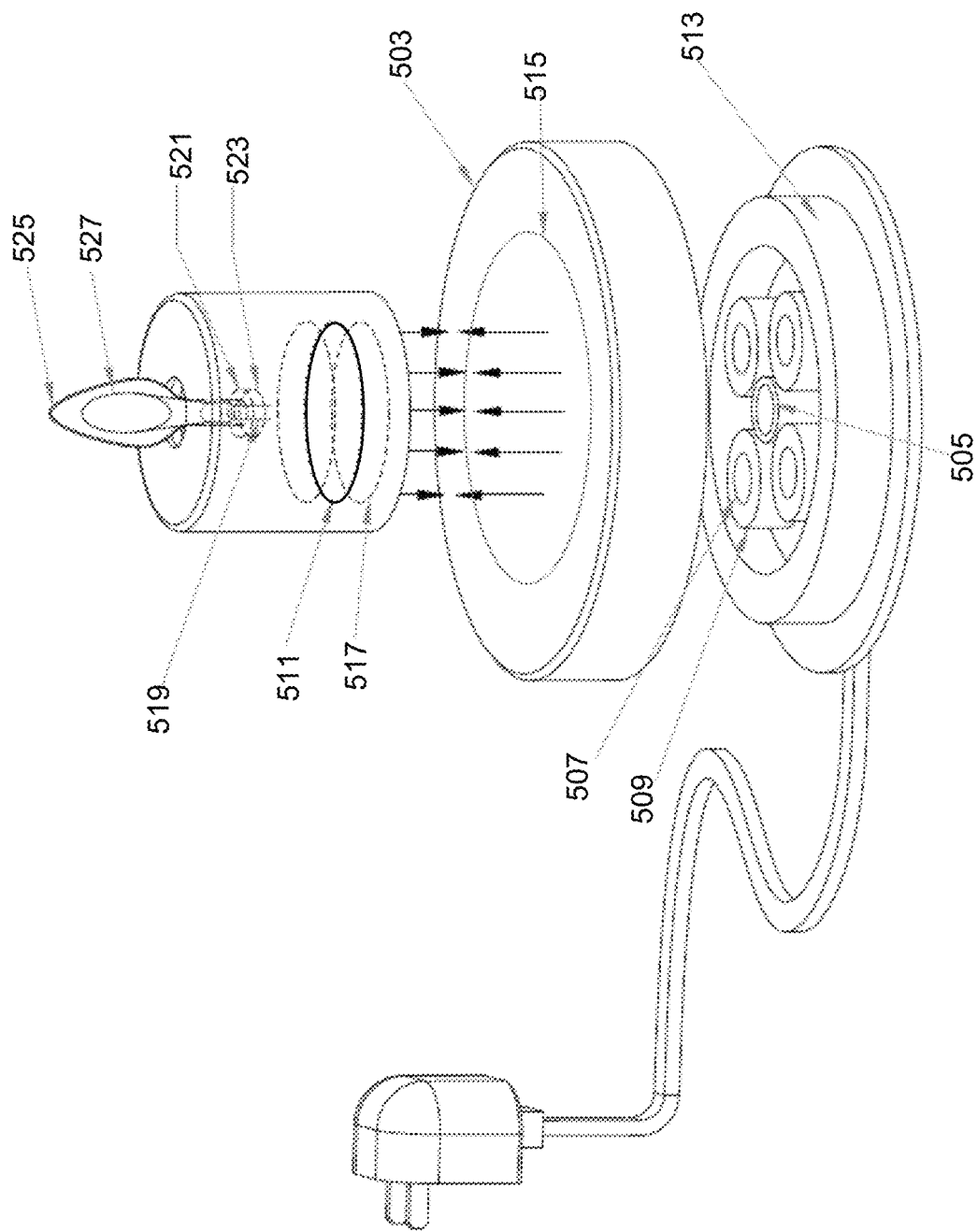
FIG. 5B illustrates some components used in the exemplary imitation candle system shown in FIG. 5A.

FIG. 5A shows an exemplary magnetic levitation mechanism for an imitation candle system. The imitation candle system includes an imitation candle device 500 and a base 501. The imitation candle device 500 is operable to levitate above the base 501. When the base 501 is powered off, the imitation device 500 sits on the base 501. When the base 501 is powered on, it provides not only the magnetic forces to enable the imitation candle device 500 to rise and hover above the base 501, but it also provides electric power for a light source in the imitation candle device 500 via an electromagnetic power transfer mechanism. FIG. 5B illustrates some of the components that can be used in one exemplary embodiment of the imitation candle device 500 and base 501 that are shown in FIG. 5A. The base 501, for example, includes a cover 503. Within the cover 503, the base 501 includes magnetic cores 507 and coils 509. One or more magnets 511 are arranged within the body of the imitation candle device 500. When the base 501 is powered on, the magnetic cores 507 and coils 509 generate a magnetic field that repels the magnets 511 of the imitation candle device 500, enabling the imitation candle device 500 to levitate above the base 501. It should be noted that the magnets 511 can be permanent magnets, or electromagnets that produce a magnetic field upon connection to a suitable power source.

The base 501 may include an additional magnet 513 that has an opposite polarity to the magnets 511 arranged within the imitation candle device 500. The opposite polarity allows the additional magnet 513 to attract the magnets 511 while the magnetic cores 507 and coils 509 repel the magnet 511, thereby balancing the magnetic forces exerted on the imitation candle device 500. The cover 503 of the base 501 can optionally include an indicator 515 to guide the user as to where to place the candle device 500 in order to enable the imitation candle device 500 to levitate without tipping over.

The movement of the imitation candle device 500 can be a gradual rotation around its center line under control of the central control circuit by fluctuations in the magnetic field of the base 501. In some embodiments, the base 501 includes a transducer 505, such as a Hall effect sensor, which varies its output voltage or current in response to a magnetic field to control the speed of rotation of the imitation candle device 500. The imitation candle device 500 may further include a small magnet 521 and one or more coils 523 at the bottom of the flame element 525. The magnet 521 and coils 523 interact independently with the magnetic field generated by the magnetic cores 507 and coils 509, allowing the flame element 525 to swing back and forth or in other directions to simulate the flickering appearance of a real flame.

When the base 501 is powered on, it can further provide electric power to the imitation candle device 500. In some embodiments, the imitation candle device 500 includes power receiver coils 517 that receive the magnetic field generated by the magnetic cores 507 and coils 509. The power receiver coils 517 convert the magnetic field back to an electric current that is used by the various components of the imitation candle device 500 such as a light source 519 (e.g., an LED) to cast a beam of light 527 onto the flame element 525. In embodiments that use an electromagnet 511 inside the imitation candle device 500, the electric current generated by the receiver coils 517 can used to also energize the electromagnets 511.

The imitation candle system may also include a candle shade (not shown). The candle shade can be transparent or translucent. The candle shade can be positioned on the base to enclose the imitation candle device. The candle shade may also include various etched patterns on its surfaces. The flickering light from the light source 519 projects through the candle shade as the flame element 525 rotates or flickers under the magnetic field, creating romantic visual effects. In some embodiments, the candle shade has a cylindrical shape. The candle shade can also have shapes such as a sphere, a vase, or other types of container.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An imitation candle system, comprising:
   a base including a cover and a plurality of magnetic coils operable to generate a magnetic field, and
   an imitation candle device that comprises:
   a body including a top surface, the top surface including an opening;
   a flame element having an upper portion shaped to mimic a flame of a candle and to protrude out of the opening;
   a first magnet arranged within the body, the first magnet having a same polarity as the magnetic field generated by the magnetic coils such that the imitation candle device is operable to levitate above the base; and a magnetic component at a lower portion of the flame element, the magnetic component operable to interact with the magnetic field, to cause movement of the flame element.

2. The imitation candle system of claim 1, wherein the imitation candle device is operable to rotate around a center line of the imitation candle device while levitating above the base.

3. The imitation candle system of claim 2, wherein the base further includes a transducer operable to control a speed of rotation of the imitation candle device.

4. The imitation candle system of claim 1, wherein the first magnet is a permanent magnet or an electromagnet.

5. The imitation candle system of claim 1, wherein the base includes a second magnet having an opposite polarity as the first magnet.

6. The imitation candle system of claim 1, wherein the base includes an indicator to delineate an area upon which the imitation candle device can be positioned on the base.

7. The imitation candle system of claim 1, wherein the imitation candle device includes a light source to emit light onto the flame element.

8. The imitation candle system of claim 7, wherein the imitation candle device further includes a power receiver coil, the power receiver coil operable to receive the magnetic field generated by the plurality of magnetic coils and provide electric power to the light source.

9. The imitation candle system of claim 1, further comprising a candle shade positioned on the base to enclose the imitation candle device.

10. The imitation candle system of claim 9, wherein the candle shade is transparent or translucent.

11. The imitation candle system of claim 9, wherein the candle shade includes an etched surface.

12. The imitation candle system of claim 9, wherein the candle shade has a shape of a cylinder or sphere.

* * * * *